(12) United States Patent
Yamazaki et al.

(10) Patent No.: US 9,223,184 B2
(45) Date of Patent: Dec. 29, 2015

(54) OPTICAL MODULATOR

(71) Applicant: NIPPON TELEGRAPH AND TELEPHONE CORPORATION, Tokyo (JP)

(72) Inventors: Hiroshi Yamazaki, Atsugi (JP); Takashi Saida, Atsugi (JP); Takashi Goh, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 14/358,362

(22) PCT Filed: Dec. 21, 2012

(86) PCT No.: PCT/JP2012/008189
§ 371 (c)(1),
(2) Date: May 15, 2014

(87) PCT Pub. No.: WO2013/094216
PCT Pub. Date: Jun. 27, 2013

(65) Prior Publication Data
US 2014/0314366 A1    Oct. 23, 2014

(30) Foreign Application Priority Data

Dec. 22, 2011  (JP) ................. 2011-281801

(51) Int. Cl.
*G02F 1/01*       (2006.01)
*G02F 1/225*     (2006.01)
*G02F 1/21*       (2006.01)

(52) U.S. Cl.
CPC .............. *G02F 1/225* (2013.01); *G02F 1/011* (2013.01); *G02F 1/2255* (2013.01); *G02F 1/2257* (2013.01); *G02F 2001/212* (2013.01)

(58) Field of Classification Search
None
See application file for complete search history.

(56) References Cited

U.S. PATENT DOCUMENTS 6,522,462 B2 * 2/2003 Chu ........................ G02F 2/004
                                                            359/344

FOREIGN PATENT DOCUMENTS

JP    2011-221258    11/2011

OTHER PUBLICATIONS

Karlsson et al. "Which is the most power-efficient modulation format in optical links?," Optics Express, vol. 17, No. 13, pp. 10814-10819, Jun. 22, 2009.

(Continued)

*Primary Examiner* — Jerry Rahll
(74) *Attorney, Agent, or Firm* — Workman Nydegger

(57) ABSTRACT

An optical modulator comprises an input optical splitting unit for bifurcating input light; a final optical coupling unit for coupling optical signals in a polarization state orthogonal to each other; an intermediate optical coupling unit provided in an intermediate position between the input optical splitting unit and the final optical coupling unit; first and second optical paths for connecting the input optical splitting unit and the intermediate optical coupling unit, optical path lengths of the first and second optical paths are approximately equal; third and fourth optical paths for connecting the intermediate optical coupling unit and the final optical coupling unit, optical path lengths of third and fourth optical paths are approximately equal; and three binary phase modulation unit arranged one by one in each of the three optical paths of the first, second, third and fourth optical paths.

8 Claims, 10 Drawing Sheets

(56) References Cited

OTHER PUBLICATIONS

Behrens et al., "Ultra-long-haul transmission of 7×42.9 Gbit/s PS-QPSK and PM-BPSK," ECOC Technical Digest 2011, Mo.2.B.2, pp. 1-3, Jul. 27, 2011.

Fischer et al.,, "Experimental Investigation of 28-GBd Polarization-Switched Quadrature Phase-Shift Keying Signals," ECOC Technical Digest 2011, Mo.2.B.1, pp. 1-3, Jul. 27, 2011.

Kikuchi, "Intersymbol Interference (ISI) Suppression Technique for Optical Binary and Multilevel Signal Generation," Journal of Lightwave Technology, vol. 25, No. 8, pp. 2060-2068, Aug. 2007.

Jinguji et al., "Synthesis of Coherent Two-Port Lattice-Form Optical Delay-Line Circuit," Journal of Lightwave Technology, vol. 13, No. 1, pp. 73-82, Jan. 1995.

Jinguji et al., "Mach-Zehnder Interferometer Type Optical Waveguide Coupler with Wavelength-Flattened Coupling Ratio," Electronics Letters, vol. 26, No. 17, pp. 1326-1327, Aug. 1990.

Sjodin et al., "Linear and Nonlinear Crosstalk Tolerance of Polarization-Switched QPSK and Polarization-Multiplexed QPSK," ECOC Technical Digest 2011, Mo.2.B5, pp. 1-3, Jul. 27, 2011.

Yamazaki et al., "IQ-Coupling-Loss-Free Polarization-Switched QPSK Modulator," Optical Fiber Communication Conference and Exposition (OFC/NFOEC) 2012 and the National Fiber Optic Engineers Conference, PDP5A.8, 3 pages, Mar. 4, 2012.

International Search Report in corresponding International Application No. PCT/JP2012/008189 dated Feb. 19, 2013.

International Preliminary Report on Patentability in corresponding App. No. PCT/JP2012/008189 dated Jun. 24, 2014.

* cited by examiner

OPTICAL MODULATOR

TECHNICAL FIELD

The present invention relates to an optical modulator that is applicable to an optical communication system.

BACKGROUND ART

In an optical fiber communication system, it is an important problem to improve a receiving sensitivity to expand a transmission distance. Recently, thanks to rapid progress of a digital coherent technology by a combination of digital signal processing (DSP) and a coherent transmission technology, selections of modulation formats in optical communications have largely been widened. Therefore, there have been made many attempts to improve the receiving sensitivity by innovation of the modulation format.

Polarization-switched quadrature phase-shift keying (PS-QPSK) may be exemplified as a representative high receiving sensitivity modulation system. The PS modulation is modulation for switching the momentary polarization between two quadrature polarizations (X and Y) in response to data of 0 or 1, and thereby, an information amount of one bit/symbol can be added as compared to a single polarization signal having the same multi-valued degrees. The PS-QPSK is modulation of a total of three bits/symbol by a combination of the QPSK of two bits/symbol and the PS modulation.

As to an optical modulation system utilizing the polarization, a polarization division multiplexing (PDM) system that uses two quadrature polarizations respectively as independent channels is widely known. The PDM can double the information amount as compared to the single polarization signal (2×2=4 bits/symbol in case of PDM-QPSK). On the other hand, the receiving sensitivity in the same symbol rate is reduced to a half as compared to that in the single polarization signal. Since the modulation is momentarily performed by the single polarization in a case of the PS modulation, the information amount can be increased without deteriorating the receiving sensitivity.

In fact, Non-Patent Literature 1 shows that a signal point arrangement of PS-QPSK is an optimal arrangement in view of receiving sensitivity in a four dimensional space having respective components of X polarization in-phase (XI), X polarization quadrature (XQ), Y polarization in-phase (YI) and Y polarization quadrature (YQ) as a base. Further, also in Non-Patent literature 2, long distance transmission of 13600 km using a PS-QPSK signal of 42.7 Gbps is reported, which experimentally indicates that the PS-QPSK can be sufficiently applied also to the long distance transmission in the degree of Pacific Ocean crossing.

As to a method of generating the PS-QPSK signal, two kinds of methods shown in FIG. 2 in Non-patent Literature 1 are well known. That is, one is a method (conventional art 1) for serially connecting a QPSK modulator and a polarization modulator, and the other is a method (conventional art 2) in which a PDM-QPSK modulator is used, and a particular correlation is formed between signals of four lines driving the PDM-QPSK modulator, whereby a half of signal points of the PS-QPSK is thinned out to generate the PS-QPSK signal.

FIG. 1 shows a configuration example of a modulator using the conventional art 1. In this example, a QPSK modulation unit 191 is serially connected to a polarization modulation unit 192. In FIG. 1, the QPSK modulation unit 191 has a general configuration, that is, the configuration in which an optical splitting circuit having an optical intensity splitting ratio of 1:1 (0.5:0.5) and an optical coupling circuit having an optical coupling ratio of 1:1 (0.5:0.5) are provided, and BPSK modulation units 111 and 112 that perform binary phase modulation (Binary-PSK: BPSK) are respectively arranged in the respective arms in a Mach-Zehnder (MZ) circuit configured of the splitting and coupling circuits, and further, a phase shifter 121 is provided in the one-side arm for making a phase change of $\pi/2$. It is the most general to use an MZ circuit having high-speed phase modulation units in both the arms (hereinafter, simply "MZ modulation circuit") as the BPSK modulation unit. The BPSK modulation units 111 and 112 and the polarization modulation unit 192 are respectively driven by binary data signals $d_1$, $d_2$, and $d_3$.

In this example, there will be considered a case where operation polarization of the BPSK modulation units 111 and 112 is set to X polarization, and X polarization continuous light of intensity 1 is input to a main input port 101. When an input optical field to the main input port 101 expressed by Jones vector of X, Y base (the 1st row corresponds to X polarization, and the 2nd row corresponds to Y polarization) is indicated at $E_{in}$, and an output optical filed from a main output port 102 is indicated at $E_{out}$, $E_{out}$ can be expressed according to the following equation.

[Formula 1]

$$E_{out} = T_2 T_1 E_{in} \quad \text{(Equation 1)}$$

$$T_1 = \begin{pmatrix} \sqrt{r_1 r_2}\, b_1 + e^{j\frac{\pi}{2}} \sqrt{(1-r_1)(1-r_2)}\, b_2 & 0 \\ 0 & a \end{pmatrix}$$

$$= \frac{1}{2}\begin{pmatrix} b_1 + j b_2 & 0 \\ 0 & a \end{pmatrix}$$

$$T_2 = \begin{pmatrix} p & 0 \\ 1-p & 0 \end{pmatrix}$$

$$E_{in} = \begin{pmatrix} 1 \\ 0 \end{pmatrix}$$

$$\therefore E_{out} = \frac{1}{2}\begin{pmatrix} p(b_1 + j b_2) \\ (1-p)(b_1 + j b_2) \end{pmatrix}$$

Herein, $T_1$ and $T_2$ respectively are Jones matrixes of X, Y base expressing transmission characteristics of the QPSK modulation unit 191 and the polarization modulation unit 192. $r_1$ is an optical intensity splitting ratio of the optical splitting circuit 131 and $r_2$ is an optical coupling ratio of the optical coupling circuit 132, and in the present embodiment, $r_1 = r_2 = 0.5$. $b_1$ and $b_2$ are respectively modulation parameters of the BPSK modulation units 111 and 112, and have either one of +1 or −1 in a symbol point (center timing of a symbol on time axis). p is a modulation parameter of the polarization modulation unit 192, and has either one of 1 or 0 in a symbol point. a is transmittance of the QPSK modulation unit 191 to Y polarization, and since input light to the modulation unit is X polarization, a value of a does not affect the output light.

It should be noted that in the present specification, the optical splitting unit, the optical coupling unit, the BPSK modulation unit, other circuit elements (including a polarization rotating unit and a polarization coupling unit which will be described later), and optical waveguides for connecting them are all assumed to be in an ideal state where the excessive loss is zero, for model simplification. All the circuit elements except the polarization modulation unit and the polarization rotating unit are assumed to be in an ideal state where the polarization rotation is not generated (that is, in a state where off-diagonal elements of Jones matrix are zero).

FIG. 2A, FIG. 2B and FIG. 2C show two kinds of diagrams indicating a relation between $d_1$ to $d_3$ and $E_{out}$ in the modulator configuration shown in FIG. 1. FIG. 2A and FIG. 2B are respectively complex signal diagrams each having an X polarization component and a Y polarization component. The respective lateral axes indicate optical electrical field amplitudes $E_{XI}$ and $E_{YI}$ of I phase, and the respective vertical axes indicate optical electrical field amplitudes $E_{XQ}$ and $E_{YQ}$ of Q phase. Next, for distinction from FIG. 2C to be described, such a diagram is hereinafter called "IQ diagram". FIG. 2C is a diagram where a lateral axis indicates phase $\phi_{X'}$ of an X' polarization component and a vertical axis indicates phase $\phi_{Y'}$ of a Y' polarization component. As shown in FIG. 10, however, X' polarization axis and X polarization axis, and Y' polarization axis and Y polarization axis are respectively defined to be shifted by 45 degrees with each other. In addition, an indication range (entire width) of each of the lateral axis and the vertical axis is set to $2\pi$. This diagram is often used for expressing PS-QPSK signal point arrangement (for example, Non-Patent Literature 3), and this diagram is hereinafter called "XY diagram" for distinction from FIG. 2A and FIG. 2B.

A relation between Jones vector $E_{out}$ of the output optical light, and vertical axis values and lateral axis values of the respective diagrams ($E_{XI}$, $E_{XQ}$, $E_{YI}$, $E_{YQ}$, $\phi_{X'}$ and $\phi_{Y'}$) will be put in order as follows.

[Formula 2]

$$E_{out} = \begin{pmatrix} E_{XI} + jE_{XQ} \\ E_{YI} + jE_{YQ} \end{pmatrix} \quad \text{(Equation 2)}$$

$$= \frac{1}{\sqrt{2}} \begin{pmatrix} 1 & 1 \\ -1 & 1 \end{pmatrix} \begin{pmatrix} A'_X \exp(j\phi_{X'}) \\ A'_Y \exp(j\phi_{Y'}) \end{pmatrix}$$

$$A'_X = \frac{1}{\sqrt{2}} \sqrt{(E_{XI} - E_{YI})^2 + (E_{XQ} - E_{YQ})^2}$$

$$A'_Y = \frac{1}{\sqrt{2}} \sqrt{(E_{XI} + E_{YI})^2 + (E_{XQ} + E_{YQ})^2}$$

$$\phi'_X = \arg\{E_{XI} - E_{YI} + j(E_{XQ} - E_{YQ})\}$$

$$\phi'_Y = \arg\{E_{XI} + E_{YI} + j(E_{XQ} + E_{YQ})\}$$

It should be noted that in the modulation system which does not include intensity modulation, such as PS-QPSK, PDM-QPSK or the like, $A_{X'}$ and $A_{Y'}$ always have constant values. Therefore, $\phi_{X'}$ and $\phi_{Y'}$ are sufficient as parameters for expressing the signal point arrangement, and the arrangement of all the signal points can be expressed by a single diagram when the XY diagram is used.

According to Equation 1 and Equation 2, a relation between vertical axis values and lateral axis values of the respective diagrams and modulation parameters of the respective modulation units is as follows.

[Formula 3]

$$E_{XI} = \frac{1}{2}pb_1 \quad \text{(Equation 3)}$$

$$E_{XQ} = \frac{1}{2}pb_2$$

$$E_{YI} = \frac{1}{2}(1-p)b_1$$

$$E_{YQ} = \frac{1}{2}(1-p)b_2$$

$$\phi'_X = \arg\{(2P-1)b_1 + j(2p-1)b_2\}$$

$$\phi'_Y = \arg\{b_1 + jb_2\}$$

$[d_1 d_2 d_3]$ in FIG. 2A, FIG. 2B, and FIG. 2C indicate mapping of drive binary data to the respective signal points. A data bit value is associated with a value of a modulation parameter in each BPSK modulation unit in a symbol point in a one-to-one relation. Herein, as to the BPSK modulators 111 and 112 (n=1, 2) in FIG. 1, when $d_n=0$, $b_n=+1$ (phase 0), and when $d_n=1$, $b_n=-1$ (phase $\pi$). In addition, as to the polarization modulation unit 192 in FIG. 1, when $d_3=0$, p=1, and when $d_3=1$, p=0. According to the above corresponding relation and the Equation 3, the mapping shown in each of FIG. 2A, FIG. 2B and FIG. 2C can be obtained.

As shown in the IQ amplitude diagram in each of FIG. 2A and FIG. 2B, when $d_3=0$, signal intensity of Y polarization is zero, when $d_3=1$, signal intensity of X polarization is zero, and a signal state in a polarization side of intensity non-zero takes four values equivalent to the QPSK signal arrangement corresponding to $d_1$ and $d_2$.

As shown in FIG. 2C, when the XY diagram is used, signal points of $2^3=8$ points of PS-QPSK which is three bits/symbol modulation can be all expressed at a time. When an output signal is X polarization ($d_3=0$), a phase difference between X' component and Y' component is zero. Therefore, the corresponding point is on a straight line of inclination 1 passing through the origin. When the output signal is Y polarization ($d_3=1$), the phase difference between X' component and Y' component is $\pi$. Therefore, the corresponding point is on a straight line where the section is $\pi$ or $-\pi$, and the inclination is 1.

FIG. 3 shows a modulator configuration example using the conventional art 2. In this example, a PDM-QPSK modulator 300 is used. The PS-QPSK 300 uses a general configuration, that is, the configuration that QPSK modulation units 391 and 392 having the same configuration as that of the conventional art 1 are connected to the respective outputs of an optical splitting unit 330 having a splitting ratio of 1:1, the output of the QPSK modulation unit 391 is connected directly to a polarization coupling unit 352, and the output of the QPSK modulation unit 392 is connected through a 90-degree polarization rotating unit 351 to the polarization coupling unit 352. BPSK modulation units 311 to 314 are respectively driven by binary data signals $d_1$ to $d_4$. Among them, $d_1$ to $d_3$ use independent data signals, and $d_4$ is generated to be [Formula 4: $d_4=(d_1 \oplus d_2)\oplus d_3$] ([Formula 5: "$\oplus$"] expresses XOR calculation).

Hereinafter, there will be considered a case where operation polarization of the BPSK modulation units 311 and 314 is indicated at X' for descriptive purposes, and X' polarization continuous light of intensity 1 is input to a main input port 301. When Jones vector of X', Y' base (the 1st row corresponds to X' polarization and the 2nd row corresponds to Y' polarization) of output light from a main output port 302 is indicated at $E_{out}$, and Jones vector of X, Y base (the 1st row corresponds to X polarization and the 2nd row corresponds to Y polarization) is indicated at $E_{out}$, the following relation is established.

[Formula 6]

$$E'_{out} = \left\{ S'_1 T'_1 \frac{1}{\sqrt{2}} + S'_2 R' T'_2 \frac{1}{\sqrt{2}} \right\} \begin{pmatrix} 1 \\ 0 \end{pmatrix} \quad \text{(Equation 4)}$$

$$T'_1 = \frac{1}{2} \begin{pmatrix} b_1 + jb_2 & 0 \\ 0 & a_1 \end{pmatrix}$$

$$T'_2 = \frac{1}{2} \begin{pmatrix} b_3 + jb_4 & 0 \\ 0 & a_2 \end{pmatrix}$$

$$R' = \begin{pmatrix} 0 & -1 \\ 1 & 0 \end{pmatrix}$$

$$S'_1 = \begin{pmatrix} 1 & 0 \\ 0 & 0 \end{pmatrix}$$

$$S'_2 = \begin{pmatrix} 0 & 0 \\ 0 & 1 \end{pmatrix}$$

$$\therefore E'_{out} = \frac{1}{2\sqrt{2}} \begin{pmatrix} b_1 + jb_2 \\ b_3 + jb_4 \end{pmatrix}$$

$$E_{out} = \frac{1}{\sqrt{2}} \begin{pmatrix} 1 & 1 \\ -1 & 1 \end{pmatrix} E_{out}'$$

$$= \frac{1}{4} \begin{pmatrix} b_1 + b_3 + j(b_2 + b_4) \\ -b_1 + b_3 + j(-b_2 + b_4) \end{pmatrix}$$

Here, $T_1'$ and $T_2'$ are respectively Jones matrixes of X', Y' base expressing transmission characteristics of the QPSK modulation units 391 and 392, R' is Jones matrix of X', Y' base expressing transmission characteristics of the 90-degree polarization rotating unit 351, $S_1'$ and $S_2'$ are respectively Jones matrixes of X', Y' base expressing transmission characteristics of the polarization coupling unit 352 to inputs from a port 1 (side of the QPSK modulation units 391) and a port 2 (side of the QPSK modulation unit 392). A coefficient $$\left[ \text{Formula 7:} \quad \frac{1}{\sqrt{2}} \right]$$

of a right side in the first line expresses a branch by the optical splitting unit 330. $b_1$ to $b_4$ are respectively modulation parameters of the BPSK modulation units 311 to 314, and take either one of +1 or −1 in a symbol point (center timing of a symbol on time axis). $a_1$ and $a_2$ are respectively transmittances of the QPSK modulation units 391 and 392 to Y' polarization, and since input light to the modulation unit is X' polarization, values of $a_1$ and $a_2$ do not affect the output light.

According to Equation 2 and Equation 4, the following relation is established in the present example.

[Formula 8]

$$E_{XI} = \frac{1}{4}(b_1 + b_3) \quad \text{(Equation 5)}$$

$$E_{XQ} = \frac{1}{4}(b_2 + b_4)$$

$$E_{YI} = \frac{1}{4}(-b_1 + b_3)$$

$$E_{YQ} = \frac{1}{4}(-b_2 + b_4)$$

$$\phi'_X = \arg\{b_1 + jb_2\}$$

$$\phi'_Y = \arg\{b_3 + jb_4\}$$

FIG. 4B shows an XY diagram expressing a relation between $d_1$ to $d_4$ and $E_{out}$ in the modulator configuration shown in FIG. 3. [$d_1$ $d_2$ $d_3$ $d_4$] in the figure indicates mapping of drive binary data to each signal point. A data bit value is associated with a value of a modulation parameter in each BPSK modulation unit in a symbol point in a one-to-one relation. Herein, when $d_n$=0, $b_n$=+1 (phase 0), and when $d_n$=1, $b_n$=−1 (phase π). According to the above corresponding relation and Equation 5, the mapping shown in FIG. 4B can be obtained.

For facilitating understanding of the operation principle in the present example, FIG. 4A firstly shows a signal point arrangement in a case where all of $d_1$ to $d_4$ are provided as independent data, that is, in a case of a regular PDM-QPSK drive. It is found out that signal points of $2^4$=16 points of PDM-QPSK which is four bits/symbol modulation are arranged in a lattice shape of 4×4. [$d_1$ $d_2$] corresponds to a lateral axis and [$d_3$ $d_4$] corresponds to a vertical axis.

Next, by referring to FIG. 4B, it is found out that by associating $d_4$ with $d_1$ to $d_3$ as [Formula 9: $d_4$=($d_1 \oplus d_2$)$\oplus$+$d_3$] according to the drive method in this example, a half of the signal points are thinned out to produce a signal point arrangement of PS-QPSK as similar to that of FIG. 2C.

CITATION LIST

Non-Patent Literature

NPL 1: M. Karlsson and E. Agrell, "Which is the most power-efficient modulation format in optical links?," Opt. Exp., vol. 17, no. pp. 10814-10819, 2009.

NPL 2: C. Behrens, D. Layery, D. S. Millar, S. Makovejs, B. C. Thomsen, R. I. Killey, S. J. Savory and P. Bayvel, "Ultra-long-haul transmission of 7×42.9 Gbit/s PS-QPSK and PM-BPSK," Proc. ECOC2011, Mo. 2. B. 2, 2011.

NPL 3: J. K. Fischer, L. Molle, M. Nolle, D.-D. Gross, C. Schubert, "Experimental Investigation of 28-GBd Polarization-Switched Quadrature Phase-Shift keying Signals," Proc. ECOC2011, Mo. 2. B. 1, 2011.

NPL 4: N. Kikuchi, "Intersymbol Interference (ISI) Suppression Technique for Optical Binary and Multilevel Signal Generation," J. Lightwave Technol., Vol. 25, No. 25, No. 8, pp. 2060-2068, 2007.

NPL 5: K. Jinguji, and M. Kawachi, "Synthesis of Coherent Two-Port Lattice-Form Optical Delay-Line Circuit, "J. Lightwave Technol., Vol. 13, No. 1, pp. 73-82, 1995.

NPL 6: K. Jinguji, N. Takato, A. Sugita, and M. Kawachi, "Mach-Zehnder interferometer type optical waveguide coupler with wavelength-flattened coupling ratio, "Electron. Lett., Vol. 26, No. 17, pp. 1326-1327, 1990.

SUMMARY OF INVENTION

Technical Problem

However, the above conventional arts 1 and 2 have a common problem that intrinsic optical loss is generated due to the modulator configuration. Note that "intrinsic optical loss due to the modulator configuration" (hereinafter, simply "intrinsic loss") herein means an optical loss unavoidably generated in generating processes of optical signals also under an ideal condition that propagation loss of an optical waveguide, loss by process errors or the like are zero. Output optical intensity in a symbol point in the conventional art 1 or 2 in a case where the input optical intensity is set to 1 is equivalent to $|E_{out}|^2$ in Equation 1 and Equation 4, but it is found out that in any case, $|E_{out}|^2=\frac{1}{2}$ all the time, and intrinsic loss of 3 dB is generated.

In addition, the conventional art 1 has a problem that an additional loss is further generated due to the configuration of the polarization modulation unit. For example, in Non-Patent Literature 3, output light of the QPSK modulation unit is split into two paths, and an on-off modulator is provided in each path to always block either one of the two split signals, which is output through a polarization beam combiner in such a manner as to output polarization that differs depending on the passed optical path. However, in this configuration, an excessive loss of 3 dB is generated in the polarization modulation unit (on-off modulation unit).

In addition, in the conventional art 2, an electronic circuit including an XOR gate for generating $d_4$ is necessary and further, binary data drive systems of four lines and four BPSK modulation units are required for modulation of three bits/symbol. Therefore, there is a problem that the device becomes complicated. (In general, the number of the binary data drive systems and the number of the BPSK modulation units are respectively N.)

The present invention is made in view of this problem, and an object of the present invention is to provide a PS-QPSK optical modulator in which intrinsic optical loss is not generated and a configuration is simple.

Solution to Problem

For solving the above problem, an optical modulator according to claim 1 in the present invention includes an input optical splitting unit for bifurcating input light from a main input port, a final optical coupling unit for coupling optical signals of two lines in a polarization state orthogonal to each other to output to a main output port, an intermediate optical coupling unit provided in an intermediate position between the input optical splitting unit and the final optical coupling unit, the intermediate optical coupling unit including at least two input ports and at least two output ports, first and second optical paths for connecting the input optical splitting unit and the intermediate optical coupling unit, optical path lengths of the first and second optical paths are approximately equal to each other, third and fourth optical paths for connecting the intermediate optical coupling unit and the final optical coupling unit, optical path lengths of third and fourth optical paths are approximately equal to each other, and three binary phase modulation unit arranged one by one in each of the three optical paths of the first, second, third and fourth optical paths.

In addition, an optical modulator according to claim 2 in the present invention is characterized in that each of the binary phase modulation unit is a Mach-Zehnder modulation circuit.

In addition, an optical modulator according to claim 3 in the present invention includes a phase adjusting unit for adjusting a relative optical phase between the first and second optical paths.

In addition, an optical modulator according to claim 4 in the present invention includes an optical intensity adjusting unit provided in a single optical path, in which the binary phase modulation unit is not arranged, among the first, second, third and fourth optical paths.

Advantageous Effects of Invention

According to the present invention, there is provided a PS-QPSK optical modulator in which intrinsic optical loss is not generated and the configuration is simple.

DESCRIPTION OF EMBODIMENTS

Figure 1:
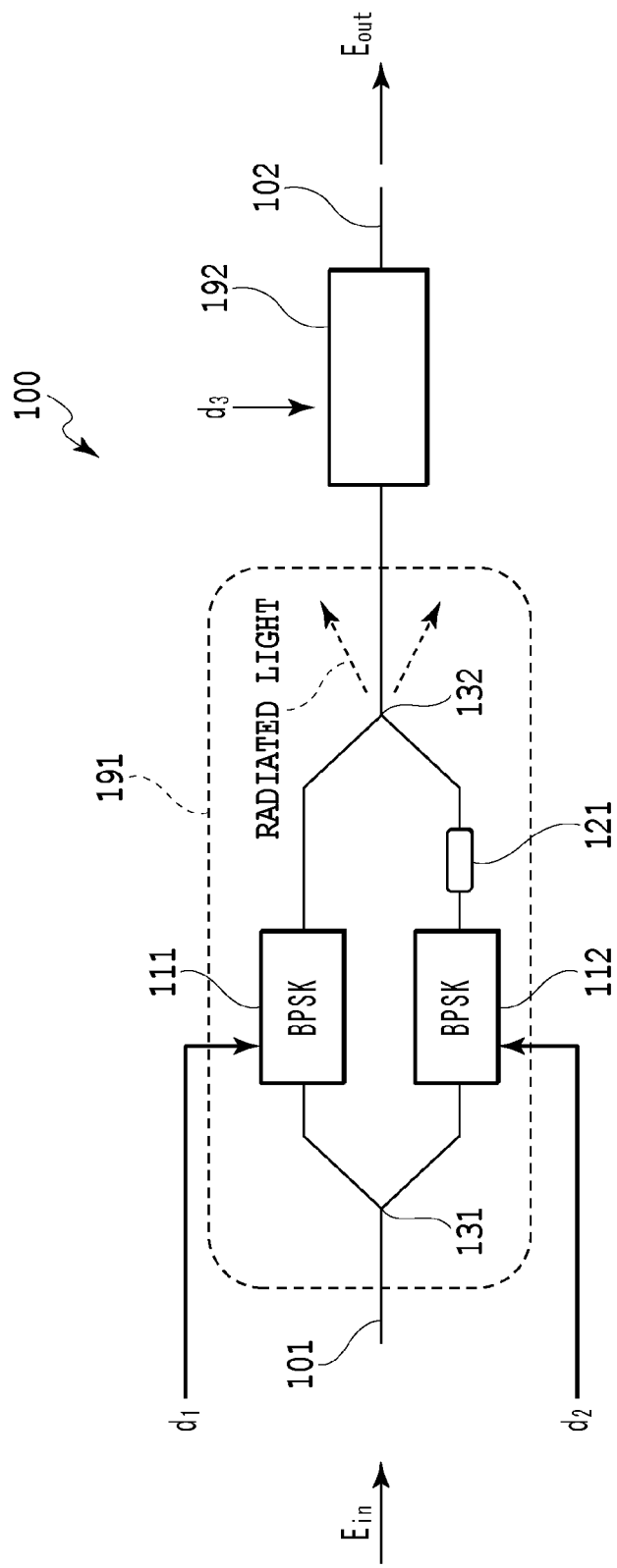
FIG. 1 is a diagram illustrating a circuit configuration of a PS-QPSK modulator according to a first conventional art.

The present invention relates to a circuit configuration of a modulator. Since the effect does not depend on a material forming the modulator, the material is not particularly specified in embodiments as shown below. An example of the material forming the modulator may include a multi-elemental oxide crystal such as $LiNbO_3$ (LN), $KTa_{1-x}Nb_xO_3$, or $K_{1-y}Li_yTa_{1-x}Nb_xO_3$, having a Pockels effect which is one kind of an electro-optic (EO) effect, a GaAs or InP compound semiconductor in which modulation of a refractive index or an absorption coefficient by an electro-absorption (EA) effect or by a quantum confined stark effect (QCSE) is possible, or a polymer having an EO effect, such as chromophore. Further, for producing the modulator circuit having a complicated configuration in a low loss, as shown in Non-Patent Literature 1, a junction type configuration by different kinds of substrates composed of the above material substrate and silica planar lightwave circuits (PLCs) may be used. Further, a bulk type optical element may be used as the polarization rotating unit or the polarization coupling unit.

Hereinafter, in the embodiment, the configuration of a multilevel modulator by a combination of a plurality of BPSK modulation units is shown. It is the most general to use an MZ modulation circuit as the BPSK modulation unit. AS in detail discussed in Non-Patent Literature 4, there is an advantage that, when the MZ modulation circuit is driven in a push-pull manner by a voltage amplitude that causes an arm-to-arm phase difference $+\pi$ to $-\pi$, pulsation of optical output due to drive electrical signal noises can be controlled to the minimum to suppress interference between symbols. However, since the effect of the present invention does not depend on a specific configuration of the BPSK modulation unit, for example, a straight phase modulator or the like may be used.

It should be noted that, unless particularly mentioned, optical path lengths of both the arms in the MZ circuit are all equal. In fact, a deviation of the optical path length is generated by a process error, a DC drifter or the like, but such a deviation is generally compensated for by adjustment of a phase shifter. Since the compensation amount variously differs depending on materials, manufacturing conditions, use environments of the modulator or the like, it cannot be uniquely determined. Therefore, a value of a phase shift amount in the phase shifter in the following embodiment will not contain a phase shift amount for the optical path length compensation. Hereinafter, in the embodiment, the phase shift is arranged only in one arm of the MZ circuit in order to simplify the explanation by equations, but since a phase difference between arms is an essential parameter in the MZ circuit, in a case where the phase shifter is arranged in the other arm or in both the arms, it is obvious that the same effect can be obtained. The effect of the present invention does not depend on the selection of the arm (one arm, the other arm and both the arms) in which the phase shifter is arranged.

(First Embodiment)

Figure 5:
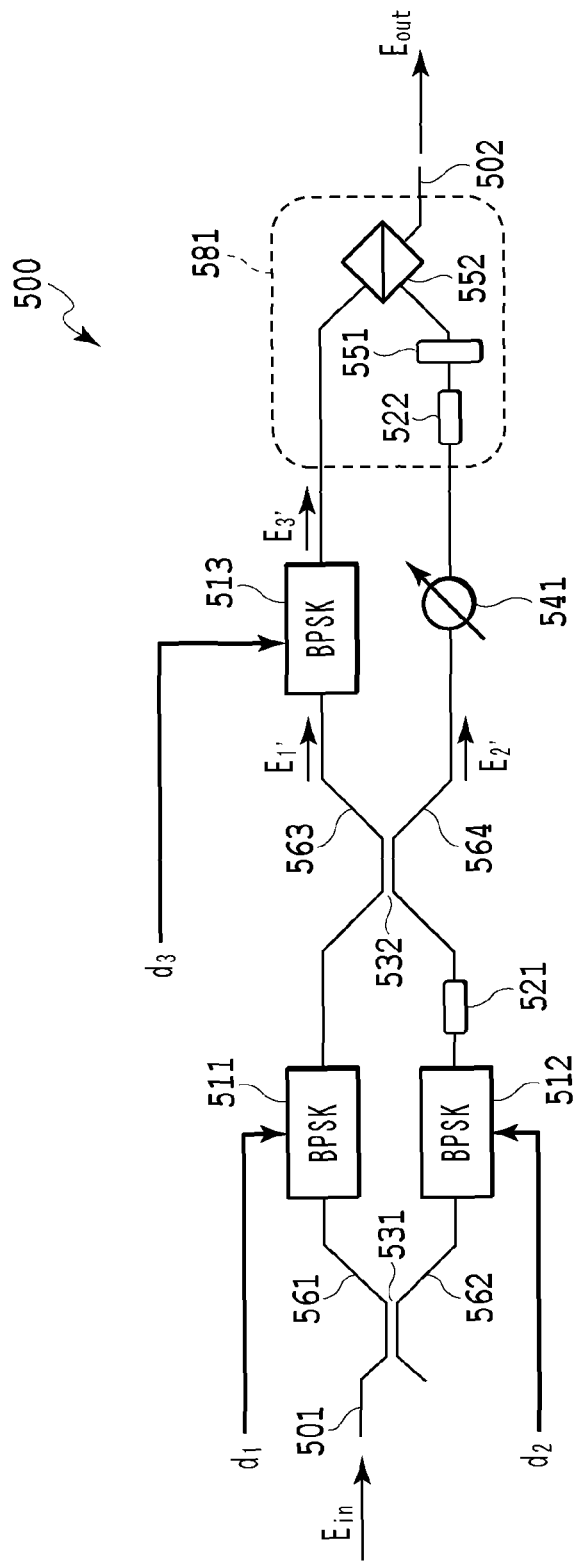
FIG. 5 is a diagram illustrating a circuit configuration of a PS-QPSK modulator according to a first embodiment in the present invention.

FIG. 5 shows the configuration of a PS-QPSK modulator according to a first embodiment in the present invention. The PS-QPSK modulator includes a main input port 501, an input optical splitting unit 531, an intermediate optical coupling unit 532, a final optical coupling unit 581, optical paths 561 and 562 connecting the input optical splitting unit and the intermediate optical coupling unit, optical paths 563 and 564 connecting the intermediate optical coupling unit and the final optical coupling unit, BPSK modulation units 511, 512 and 513 arranged in the optical paths 561, 562 and 563 respectively, a phase adjusting unit 521 for adjusting a relative phase between the optical paths 561 and 562 to $\pi/2$, an optical intensity adjusting unit 541 arranged in the optical path 564, and a main output port 502. An optical path length of the optical path 561 is approximately equal to that of the optical path 562, and an optical path length of the optical path 563 is also approximately equal to that of the optical path 564. ("the optical path lengths are approximately equal" herein means that a group delay time difference between optical paths is sufficiently smaller than the inverse of the modulation symbol rate, that is, one symbol time.) The final optical coupling unit 581 includes a phase adjusting unit 522 for adjusting a relative phase between the optical paths 563 and 564 to zero, a polarization rotating unit 551 for rotating a polarization of an optical signal of the optical path 564 by 90 degrees, and a polarization coupling unit 552. In addition, since the excessive loss of the BPSK modulation unit is assumed to be 0 dB in the present specification as described above, the optical intensity adjusting unit 541 is also assumed to be set to the loss of 0 dB. In fact, the loss of the optical intensity adjusting unit 541 is set to a value equal to the excessive loss of the BPSK modulation unit 513.

The QPSK modulator formed of the input optical splitting unit 531, the BPSK modulation units 511 and 512, the phase adjusting unit 521, and the intermediate optical coupling unit 532 configures a QPSK modulation unit approximately equivalent to that used in the above conventional arts 1 and 2, but differs in a point where the optical splitting unit 531 and the coupling unit 532 are a directional coupler of two inputs and two outputs having an optical intensity coupling ratio of 1:1 (0.5:0.5).

As well known, transmission characteristics of the directional coupler can be expressed according to the following equation (refer to Non-Patent Literature 5 and the like).

[Formula 10]

$$E_{out,C} = \sqrt{r} \cdot E_{in,A} - j\sqrt{1-r} \cdot E_{in,B}$$

$$E_{out,D} = -j\sqrt{1-r} \cdot E_{in,A} + \sqrt{r} \cdot E_{in,B} \quad \text{(Equation 6)}$$

Note that $E_{in,A}$ and $E_{in,B}$ are respectively input optical fields from input ports A and B, and $E_{out,C}$ and $E_{out,D}$ are respectively output optical fields from output ports C and D (any of them is expressed by a complex number), and r is an optical intensity coupling ratio.

Hereinafter, operation polarization of the BPSK modulation units 511 to 513 is indicated at X', and X' polarization continuous light of intensity 1 is input to the main input port 501. When the transmission characteristic, which is expressed using Jones matrix of X', Y' base, from the main input port to the output port in the side of the optical path 561 in the intermediate optical coupling unit is indicated at $T_1'$, and the transmission characteristic, which is expressed using Jones matrix of X', Y' base, from the main input port to the output port in the side of the optical path 562 in the intermediate optical coupling unit is indicated at $T_2'$, $T_1'$ and $T_2'$ can be expressed as follows.

[Formula 11]

$$T_1' = \begin{pmatrix} \frac{1}{\sqrt{2}} b_1 \frac{1}{\sqrt{2}} + \frac{-j}{\sqrt{2}} jb_2 \frac{-j}{\sqrt{2}} & 0 \\ 0 & a_1 \end{pmatrix} \quad \text{(Equation 7)}$$

$$= \frac{1}{2} \begin{pmatrix} b_1 - jb_2 & 0 \\ 0 & a_1 \end{pmatrix}$$

$$T_2' = \begin{pmatrix} \frac{-j}{\sqrt{2}} b_1 \frac{1}{\sqrt{2}} + \frac{1}{\sqrt{2}} jb_2 \frac{-j}{\sqrt{2}} & 0 \\ 0 & a_2 \end{pmatrix}$$

$$= \frac{1}{2} \begin{pmatrix} b_2 - jb_1 & 0 \\ 0 & a_2 \end{pmatrix}$$

Herein, $b_1$ and $b_2$ are respectively modulation parameters of the BPSK modulation units 511 and 512, and take either one of +1 or −1 in a symbol point (center timing of a symbol on time axis). $a_1$ and $a_2$ are transmission rates to Y' polarization respectively. Since the input light to the modulation unit is X' polarization, values of $a_1$ and $a_2$ do not affect the output light.

When Jones vector of X', Y' base in the signal light in the output port in the side of the optical path 563 in the intermediate optical coupling unit is indicated at $E_1'$, when Jones vector of X', Y' base in the signal light in the output port in the side of the optical path 564 is indicated at $E_2'$, and when Jones vector of X', Y' base in the signal light immediately after the BPSK modulation unit 513 is indicated at $E_3'$, $E_1'$, $E_2'$ and $E_3'$ are as follows according to Equation 7.

[Formula 12]

$$E_1' = T_1'\begin{pmatrix} 1 \\ 0 \end{pmatrix} = \frac{1}{2}\begin{pmatrix} b_1 - jb_2 \\ 0 \end{pmatrix} \quad \text{(Equation 8)}$$

$$E_2' = T_2'\begin{pmatrix} 1 \\ 0 \end{pmatrix} = \frac{1}{2}\begin{pmatrix} b_2 - jb_1 \\ 0 \end{pmatrix}$$

$$E_3' = \begin{pmatrix} b_3 & 0 \\ 0 & 0 \end{pmatrix} E_1' = \frac{1}{2}\begin{pmatrix} b_3(b_1 - jb_2) \\ 0 \end{pmatrix}$$

Herein, $b_3$ is a modulation parameter of the BPSK modulation unit 513, and takes either one of +1 or −1 in a symbol point (center timing of a symbol on time axis). $a_3$ is a transmission rate to Y' polarization of the BPSK modulation unit 513. Since the input light to the modulation unit is X' polarization, a value of $a_3$ does not affect the output light. Comparing $E_1'$ and $E_2'$, plus and minus of a relative phase of $b_1$ term and $b_2$ term are replaced, and it is found out that these signal lights have a relation of a positive phase signal and a reverse phase signal with each other.

When Jones vector of X', Y' base of the output light from the main output port 502 is indicated at $E_{out}'$ and when Jones vector of X, Y base of the output light from the main output port 502 is indicated at $E_{out}$, the following relation is established.

[Formula 13]

$$E_{out}' = S_1' E_3' + S_2' R' e^{j\phi} E_2' \quad \text{(Equation 9)}$$

$$\phi = 0$$

$$R' = \begin{pmatrix} 0 & -1 \\ 1 & 0 \end{pmatrix}$$

$$S_1' = \begin{pmatrix} 1 & 0 \\ 0 & 0 \end{pmatrix}$$

$$S_2' = \begin{pmatrix} 0 & 0 \\ 0 & 1 \end{pmatrix}$$

$$\therefore E_{out}' = \frac{1}{2}\begin{pmatrix} b_3(b_1 - jb_2) \\ b_2 - jb_1 \end{pmatrix}$$

$$E_{out} = \frac{1}{\sqrt{2}}\begin{pmatrix} 1 & 1 \\ -1 & 1 \end{pmatrix} E_{out}'$$

$$= \frac{1}{2\sqrt{2}}\begin{pmatrix} b_1 b_3 + b_2 + j(-b_1 - b_2 b_3) \\ -b_1 b_3 + b_2 + j(-b_1 + b_2 b_3) \end{pmatrix}$$

Herein, $\phi$ is a phase shift amount of the phase adjusting unit 522, and $\phi=0$ in this example. R' is a transmission characteristic of the 90-degree polarization rotating unit 551. Each of $S_1'$ and $S_2'$ is Jones matrix of X', Y' base expressing a transmission characteristic of the polarization coupling unit 552 to each of optical signals from the side of the optical path 563 and from the side of the optical path 564. In this example, the polarization coupling unit 552 is a polarization beam combiner of polarization axes X' and Y'.

The following relation is established according to Equation 2 and Equation 9 in this example.

[Formula 14]

$$E_{XI} = \frac{1}{2\sqrt{2}}(b_1 b_3 + b_2) \quad \text{(Equation 10)}$$

$$E_{XQ} = \frac{1}{2\sqrt{2}}(-b_1 - b_2 b_3)$$

$$E_{YI} = \frac{1}{2\sqrt{2}}(-b_1 b_3 + b_2)$$

$$E_{YQ} = \frac{1}{2\sqrt{2}}(-b_1 + b_2 b_3)$$

$$\phi_X' = \arg\{b_3(b_1 + jb_2)\}$$

$$\phi_Y' = \arg\{b_2 + jb_1\}$$

Figure 6A:
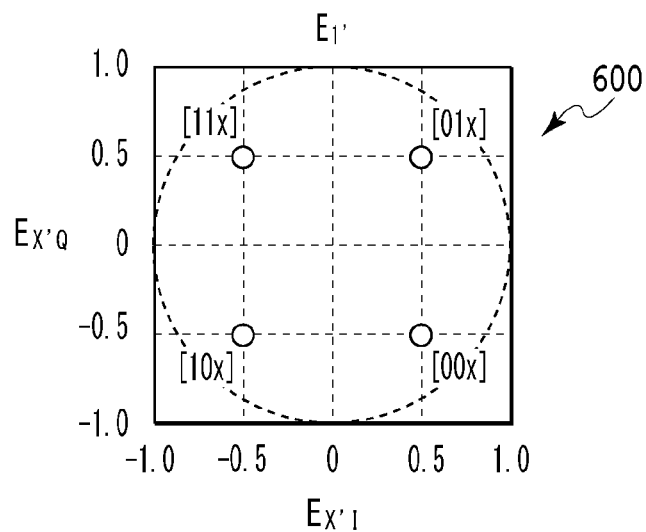
FIG. 6A is an output signal diagram illustrating an optical signal state in an inside of the PS-QPSK modulator according to the first embodiment in the present invention.
Figure 6B:
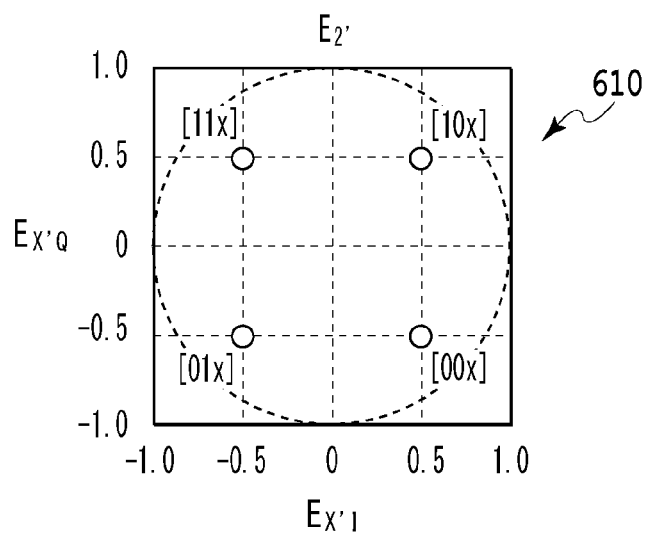
FIG. 6B is an output signal diagram illustrating an optical signal state in an inside of the PS-QPSK modulator according to the first embodiment in the present invention.
Figure 6C:
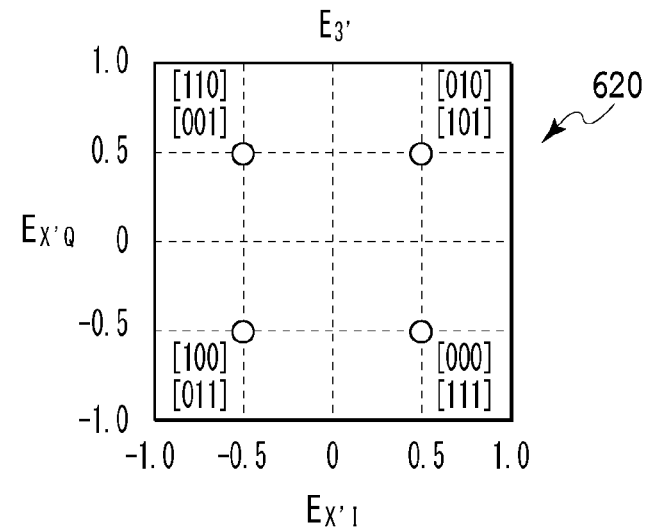
FIG. 6C is an output signal diagram illustrating an optical signal state in an inside of the PS-QPSK modulator according to the first embodiment in the present invention.

FIG. 6A, FIG. 6B, and FIG. 6C show IQ diagrams of X' polarization indicating a relation between $d_1$ to $d_3$ in the modulator configuration shown in FIG. 5, and $E_1'$, $E_2'$ and $E_3'$ shown in Equation 8. FIG. 6A is a diagram of $E_1'$. FIG. 6B is a diagram of $E_2'$. FIG. 6C is a diagram of $E_3'$. [$d_1$ $d_2$ $d_3$] in the figure indicates mapping of drive binary data to each signal point. A data bit value is associated with a value of a modulation parameter in each BPSK modulation unit in a symbol point in a one-to-one relation. Herein, when $d_n=0$, $b_n=+1$ (phase 0), and when $d_n=1$, $b_n=-1$ (phase π). When $d_3=0$, p=1, and when $d_3=1$, p=0. According to the above corresponding relation and Equation 8, the mapping shown in each of FIG. 6A, FIG. 6B and FIG. 6C can be obtained. It should be noted that since $E_1'$ and $E_2'$ do not depend on $b_3$, data of the third bit in FIG. 6A and FIG. 6B is set to x (any value).

Comparing FIG. 6A and FIG. 6B, it is found out that graphics drawn by signal points are the same squares, but differ in data mapping, and are in reverse direction with each other at tracing along the signal points in the order of [0 0 x], [0 1 x], [1 1 x] and [1 0 x]. That is, $E_1'$ and $E_2'$ have a relation of a normal phase signal and a reverse phase signal. In addition, as shown in FIG. 6C, it is found out that $E_3'$ becomes a QPSK signal in which two kinds of data overlap in each signal point.

Figure 7A:
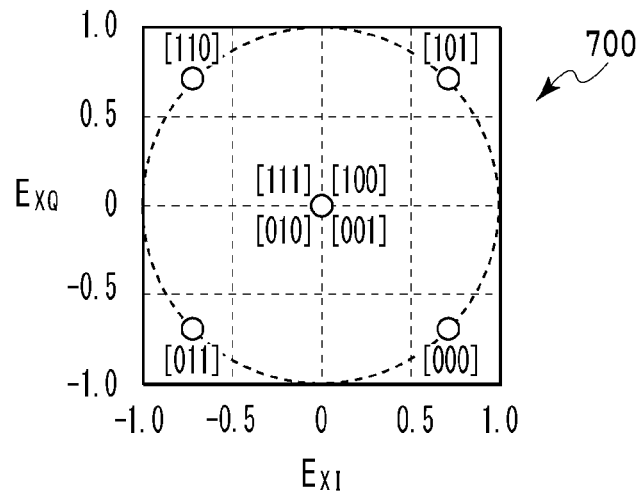
FIG. 7A is a final output signal diagram of the PS-QPSK modulator according to the first embodiment in the present invention.
Figure 7B:
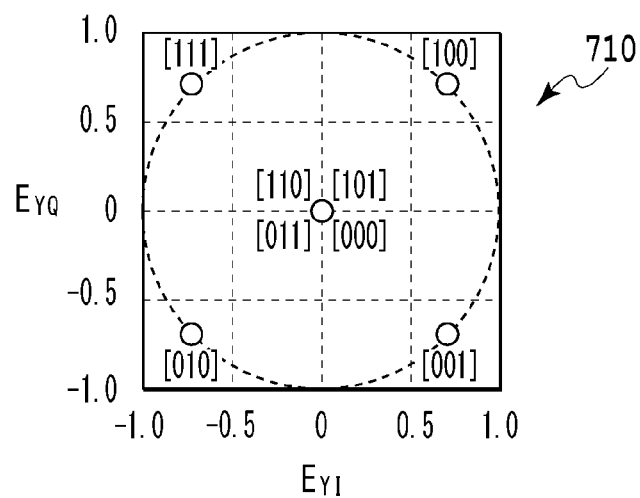
FIG. 7B is a final output signal diagram of the PS-QPSK modulator according to the first embodiment in the present invention.
Figure 7C:
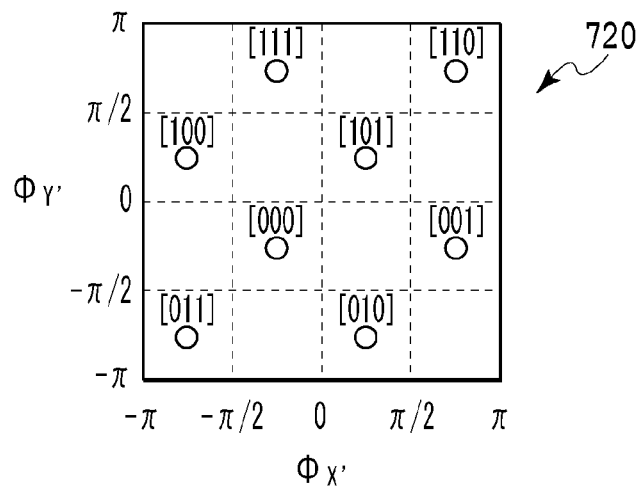
FIG. 7C is a final output signal diagram of the PS-QPSK modulator according to the first embodiment in the present invention.

FIG. 7A, FIG. 7B, and FIG. 7C show IQ diagrams and an XY diagram indicating a relation between $d_1$ to $d_3$ in the modulator configuration shown in FIG. 5 and $E_{out}$ shown in Equation 9. FIG. 7A is an IQ diagram in regard to X polarization of $E_{out}$. FIG. 7B is an IQ diagram in regard to Y polarization of $E_{out}$, and FIG. 7C is an XY diagram of $E_{out}$. The mapping shown in each of FIG. 7A, FIG. 7B and FIG. 7C can be obtained according to the corresponding relation of $d_n$ and $b_n$, and Equation 10.

Figure 2A:
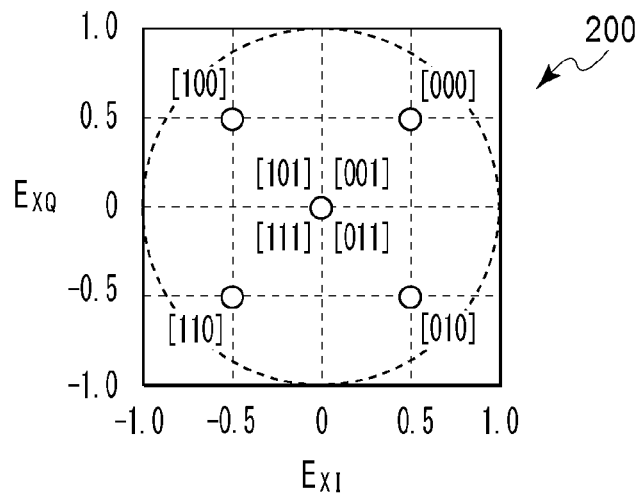
FIG. 2A is an output signal diagram of the PS-QPSK modulator according to the first conventional art.
Figure 2B:
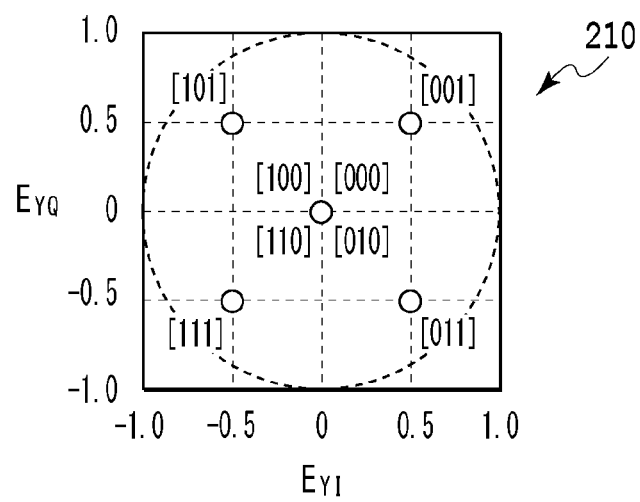
FIG. 2B is an output signal diagram of the PS-QPSK modulator according to the first conventional art.
Figure 2C:
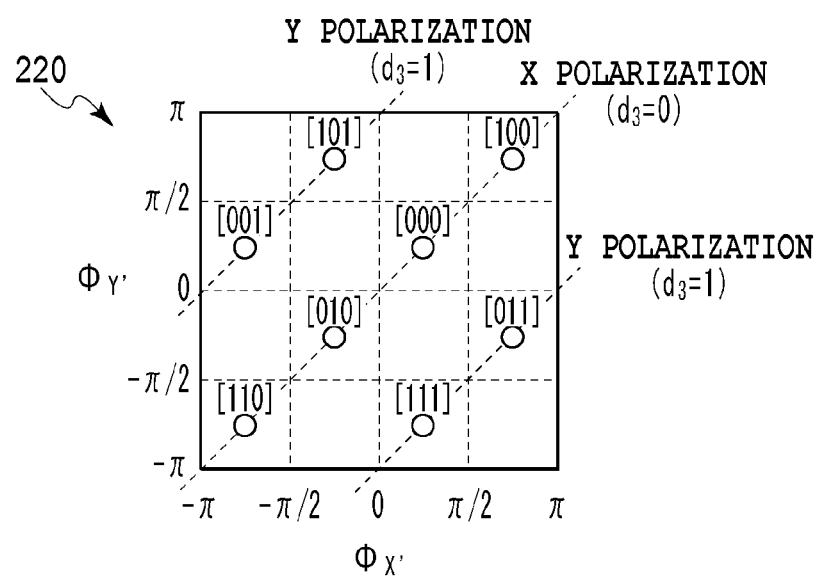
FIG. 2C is an output signal diagram of the PS-QPSK modulator according to the first conventional art.
Figure 4A:
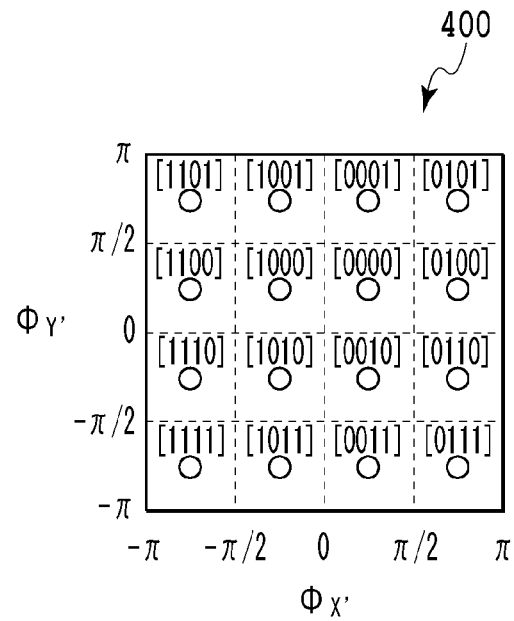
FIG. 4A is an output signal diagram of the PS-QPSK modulator according to the second conventional art.
Figure 4B:
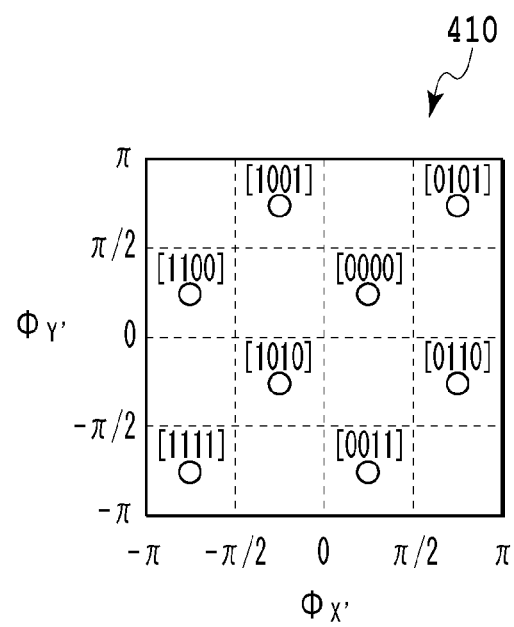
FIG. 4B is an output signal diagram of the PS-QPSK modulator according to the second conventional art.

As shown in FIG. 7C, it is found out that as similar to the output signal in the conventional art shown in FIG. 2C or FIG. 4B also in this example, the XY diagram composed of eight signal points can be obtained and the PS-QPSK signal can be obtained.

A corresponding relation between FIG. 7C and FIG. 6B, and FIG. 6C can be explained as follows. As shown in FIG. 5, $E_2'$ is incident to the polarization coupling unit 552 as X' polarization as it is, and $E_3'$ is polarization-rotated by 90 degrees to be incident to the polarization coupling unit 552 as Y' polarization. Therefore, A lateral axis in FIG. 7C corresponds to a phase of $E_3'$ shown in FIG. 6C, and a vertical axis in FIG. 7C corresponds to a phase of $E_2'$ shown in FIG. 6B. A point [$d_1$ $d_2$ x] in FIG. 6B corresponds to any of four vertical axis levels (−0.75π, −0.25π, +0.25π, +0.75π), and two points corresponding to the vertical axis level correspond to [$d_1$ $d_2$ 0] and [$d_1$ $d_2$ 1] in FIG. 6C. For example, [1 0 x] in FIG. 6B corresponds to +0.25π in the vertical axis level in FIG. 7C, and two points corresponding to [1 0 0] and [1 0 1] appear in the same vertical axis level.

Incidentally, the distance from the original point to each signal point in the IQ diagrams in FIG. 7A and FIG. 7B is [Formula 15: √2] times larger than that in the IQ diagrams in FIGS. 2A and 2B. This means that the output optical intensity that is twice that of the conventional art can be obtained in the present embodiment relative to the same input optical intensity. As described before, in the conventional arts 1 and 2 (Equations 1 and 4), $|E_{out}|^2 = \frac{1}{2}$, and in the present embodiment (Equation 9), $|E_{out}|^2 = 1$. That is, the intrinsic loss 3 dB is generated in the conventional art, and the intrinsic loss is 0 dB in the present embodiment.

As explained above, the PS-QPSK signal can be generated without generation of the intrinsic loss by a simple configuration composed of the binary data drive systems of three lines and the three BPSK modulation units.

Figure 3:
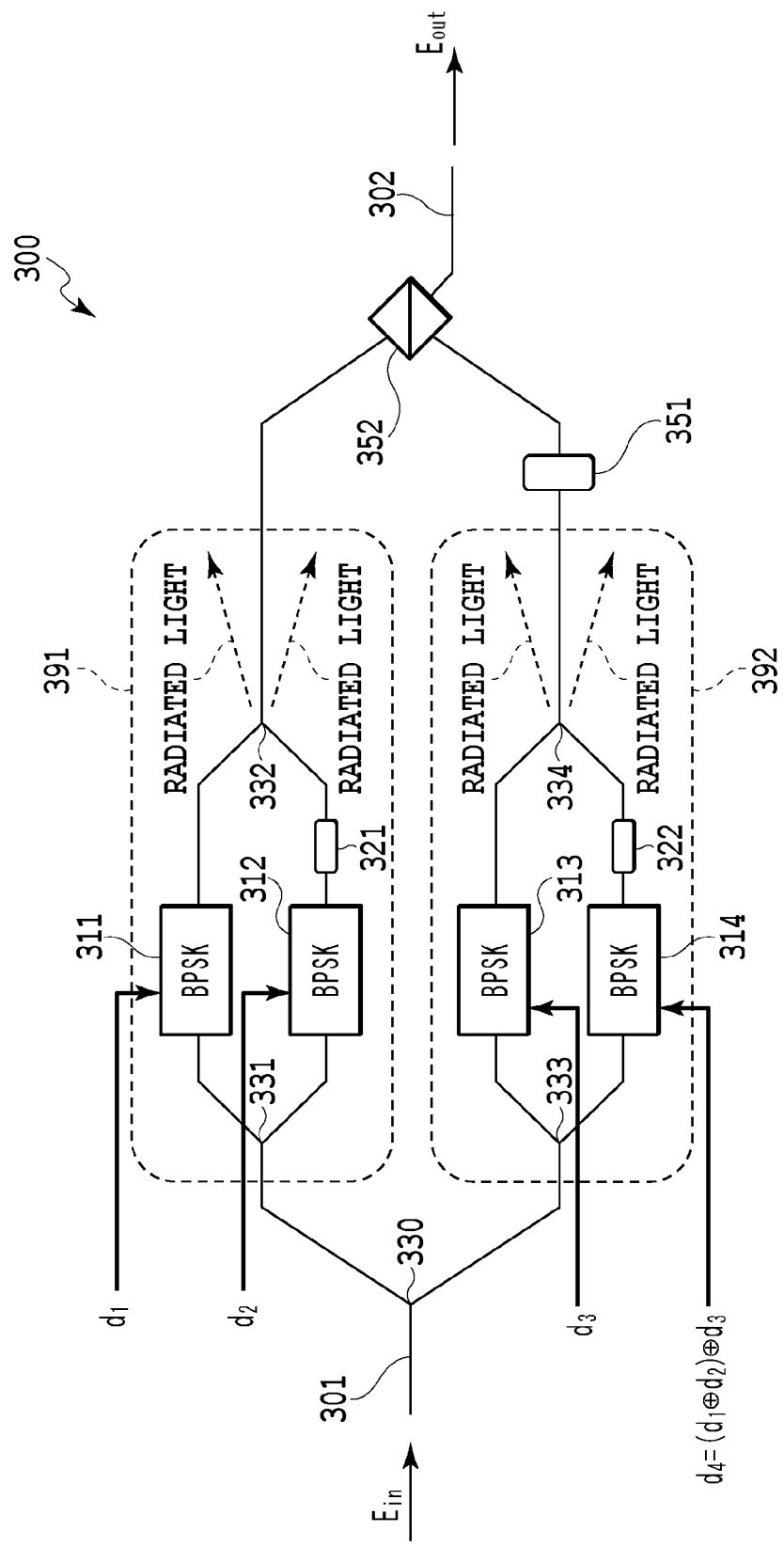
FIG. 3 is a diagram illustrating a circuit configuration of a PS-QPSK modulator according to a second conventional art.

It is already apparent by Equation 9 that the intrinsic loss is 0 dB in the present embodiment, but the principle is explained in a qualitative and intuitive manner as follows. In the conventional art, only either one of the signals corresponding to FIG. 6A and FIG. 6B, that is, a normal phase signal and a reverse phase signal is used for combination of final output signals, and the other is discarded as radiated light in the optical coupling unit as shown in FIG. 1 and FIG. 3. This causes the intrinsic loss of 3 dB. There is generally used the configuration of using the reverse phase signal (or normal phase signal) as monitor signal light without being discarded as the radiated light, but since the monitor signal light does not contribute to the output signal light also in this case, the intrinsic loss to the main output signal is the same as in the case of discarding the reverse phase signal (or normal phase signal) as the radiated light. In contrast, in the present invention, it is possible to make the intrinsic loss 0 dB with a new concept that one of the normal phase signal and the reverse phase signal is further modulated and both thereof are combined by quadrature polarization to obtain a final output signal.

In all the embodiments of the present invention including the present embodiment, a multi-mode interference (MMI) coupler or a wavelength insensitive coupler (WINC) shown in Non-Patent Literature 6 in place of the directional coupler may be used as the intermediate optical coupling unit of two inputs and two outputs. The transmission function of these couplers differs from Equation 6, but even if any coupler of two inputs and two outputs is used, optical signals from the output port have a relation of a normal phase signal and a reverse phase signal with each other. This relation can be derived from reciprocity of an optical coupler and the energy conservation law (exactly, in some cases a signal diagram is disturbed by an inner loss of a coupler, but there is no problem if a coupler having a sufficiently small inner loss is used). Further, as the input optical splitting unit, the output coupler of two inputs and two outputs may be used as in the case of this example, or a Y-branch coupler may be used. However, since the phase characteristic of a coupler differs depending on a kind of the coupler, it is necessary to change the phase shift amount of the phase shifter 521 from the above value in accordance with the kind of the coupler.

In the final optical coupling unit 581, the arrangement of the polarization rotating unit 551 is provided not only to the side of the optical path 564 as in the case of this example, but also may be provided to the side of the optical path 563 to use a polarization coupling unit in accordance therewith. In general, it is only required that polarization states in the side of the optical path 563 and in the side of the optical path 564 are orthogonal to each other, and for example, a θ-degree polarization rotating unit is provided in the side of the optical path 563 and a 90-θ-degree polarization rotating unit may be provided in the side of the optical path 564, and polarization coupling units in which the polarization axis is fitted may be used to these output polarizations.

In addition, in the optical coupling unit 581, the phase adjusting unit 522 for adjusting a relative phase between optical signals in the side of the optical path 563 and in the side of the optical path 564 is provided and the phase shift amount φ is set to 0, but in fact, in many cases this phase adjusting unit 522 may be eliminated. Because the relative phase between the optical signals in the side of the optical path 563 and in the side of the optical path 564 does not affect the polarization orthogonality in the present configuration. It is assumed that the phase adjusting unit 522 is eliminated and a relative phase $\phi_0$ between a third and second optical signals is not controlled. $\phi_0$ is a fixed value depending on refractive index fluctuation at manufacturing or the like or a value varying at a sufficient slow speed to a modulation symbol rate by DC drift in an LN waveguide or the like. Since the optical signals in the side of the path 563 and in the side of the optical path 564 are formed of an X' polarization component and a Y' polarization component in a final output signal from the main output port 502, $\phi_0$, that is, corresponds to a phase difference between the X' polarization component and the Y' polarization component in the final output signal. That is, changing $\phi_0$ corresponds to an operation of simply rotating a Poincare sphere around an $S_1$ axis, and corresponds to simply moving a signal point in parallel in a vertical axis direction by $\phi_0$ in the XY diagram in FIG. 7C. Even if such an operation is performed, since the orthogonality of the two-polarization state is maintained, the output signal has no change to be kept as the PS-QPSK signal. For example, when $\phi_0 = \pi/2$, momentary polarization of the output signal switches between clockwise polarization and counter clockwise polarization, but it has no problem since the both-polarization state is orthogonal. Further, since the polarization state generally rotates in the transmission path at a random, an operation of tracking the polarization state in the side of reception (in digital coherent transmission, it is realized in digital signal processing) becomes necessary, and $\phi_0$ is anyway automatically compensated for in the side of the reception. As a special case where the phase adjusting unit 522 is necessary, there is considered a case where an output fiber of a modulator is a polarization holding fiber and it is necessary to adapt the output polarization to an axis of the polarization holding fiber or the like.

In addition, the optical phase adjusting unit 521 can utilize a manufacturing technique to be capable of controlling the relative phase between the optical paths 561 and 562 to π/2 with high accuracy, and becomes unnecessary in a case of using a material with no generation of DC bias drift in the optical paths 1 and 2. The optical intensity adjusting unit 541 is provided for compensating for an excessive loss amount by the BPSK modulation unit 513 as described above, but since it is considered that the excessive loss of the BPSK modulation unit 513 does not usually vary with time, a loss value of the optical intensity adjusting unit 541 may basically be a fixed value. Accordingly, in a case where manufacturing variations of the BPSK modulation unit are small, for example, an adjusting unit in which the loss value is fixed in a design stage, such as intentionally decreasing a bending radius of a waveguide bending portion in the optical path 564 to increase a bending loss, or intentionally introducing waveguide disconnection of a short distance to generate a radiation loss (the adjustment after manufacturing is not allowable) may be used as the optical intensity adjusting unit 541. In a case where manufacturing variations on the excessive loss of the BPSK modulation unit 513 are large, it is desirable that the loss value of the optical intensity adjusting unit 541 can be changed as pre-shipment adjustment, but in this case, it is desirable to use a units stabilizing the loss value to a desired value by trimming by heat or optical radiation, for example, for a user not to perform the loss value adjustment for each time after the shipment. Further, in a case where the excessive loss of the BPSK modulation unit 513 is sufficiently small, the optical intensity adjusting unit 541 itself becomes unnecessary. An upper limit value $\alpha_{MAX}$ (dB) of the excessive loss in the BPSK modulation unit for making the optical intensity adjusting unit 541 unnecessary is determined by a required value of a polarization orthogonal degree found by considering characteristics of an entire transmission system including the transmission path and the receptor. Therefore the upper limit value cannot be uniquely determined, but, for example, when a required specification of the polarization orthogonal degree at an output point of the modulator is 90±δθ degrees, it can be estimated to be approximately $$[\text{Formula 16:}] \quad \alpha_{MAX} = -10\log\left[\tan\left\{(45 - \frac{\delta\theta}{2})\frac{\pi}{180}\right\}\right].$$

For example, when δθ=5 degrees, approximately $\alpha_{MAX}$=0.4 dB. Actually considering a margin to a deviation from an ideal characteristic of the polarization rotating unit 551 or the polarization coupling unit 552, it is reasonable to estimate $\alpha_{MAX}$ to be smaller than a value obtained from the above equation.

In addition, also in a case where the BPSK modulation unit 513 is arranged in the optical path 564 and the optical intensity adjusting unit 541 is arranged in the optical path 563, the data mapping is only changed, and it is obvious that the similar effect can be obtained.

(Second Embodiment)

Figure 8:
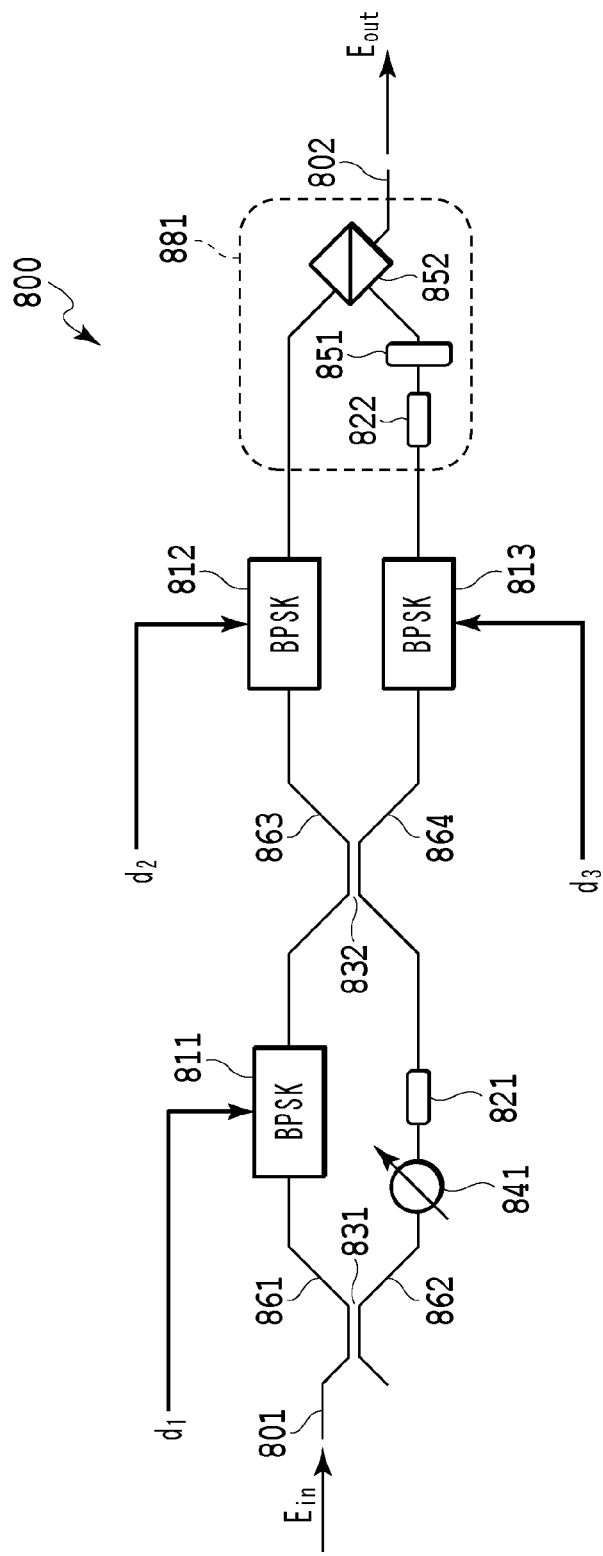
FIG. 8 is a diagram illustrating a circuit configuration of a PS-QPSK modulator according to a second embodiment in the present invention.

FIG. 8 shows the configuration of a PS-QPSK modulator according to a second embodiment in the present invention. The PS-QPSK modulator includes a main input port 801, an input optical splitting unit 831, an intermediate optical coupling unit 832, a final optical coupling unit 881, optical paths 861 and 862 connecting the input optical splitting unit and the intermediate optical coupling unit, optical paths 863 and 864 connecting the intermediate optical coupling unit and the final optical coupling unit, BPSK modulation units 811, 812 and 813 arranged in the optical paths 861, 863 and 864 respectively, a phase adjusting unit 821 for adjusting a relative phase between the optical paths 861 and 862 to π/2, an optical intensity adjusting unit 841 arranged in the optical path 862, and a main output port 802. An optical path length of the optical path 861 is approximately equal to that of the optical path 862, and an optical path length of the optical path 863 is also approximately equal to that of the optical path 864. The final optical coupling unit 881 includes a phase adjusting unit 822 for adjusting a relative phase between the optical paths 863 and 864 to zero, a polarization rotating unit 851 for rotating polarization of an optical signal of the optical path 864 by 90 degrees, and a polarization coupling unit 852. In addition, in the present specification, since the excessive loss of the BPSK modulation unit is assumed to be 0 dB as described above, the optical intensity adjusting unit 841 is also assumed to be set to the loss of 0 dB. In fact, the loss of the optical intensity adjusting unit 841 is set to be equal to a value equal to the excessive loss of the BPSK modulation unit 811.

Hereinafter, the operation polarization of the BPSK modulation units 811 to 813 is indicated at X', and X' polarization continuous light of intensity 1 is input to the main input port 801. When the transmission characteristic, which is expressed using Jones matrix of X', Y' base, from the main input port to the output port in the side of the optical path 863 in the intermediate optical coupling unit is indicated at $T_1'$, and the transmission characteristic, which is expressed using Jones matrix of X', Y' base, from the main input port to the output port in the side of the optical path 864 in the intermediate optical coupling unit is indicated at $T_2'$, $T_1'$ and $T_2'$ can be expressed as follows.

[Formula 17]

$$T_1' = \begin{pmatrix} \frac{1}{\sqrt{2}} b_1 \frac{1}{\sqrt{2}} + \frac{-j}{\sqrt{2}} j \frac{-j}{\sqrt{2}} & 0 \\ 0 & a_1 \end{pmatrix} \quad \text{(Equation 11)}$$

$$= \frac{1}{2}\begin{pmatrix} b_1 - j & 0 \\ 0 & a_1 \end{pmatrix}$$

$$T_2' = \begin{pmatrix} \frac{-j}{\sqrt{2}} b_1 \frac{1}{\sqrt{2}} + \frac{j}{\sqrt{2}} j \frac{-j}{\sqrt{2}} & 0 \\ 0 & a_2 \end{pmatrix}$$

$$= \frac{1}{2}\begin{pmatrix} 1 - jb_1 & 0 \\ 0 & a_2 \end{pmatrix}$$

Herein, $b_1$ is a modulation parameter of the BPSK modulation unit 811, and takes either one of +1 or −1 in a symbol point (center timing of a symbol on time axis). $a_1$ and $a_2$ respectively are transmission rates to Y' polarization, and since input light to the modulation unit is X' polarization, values of $a_1$ and $a_2$ do not affect the output light.

When Jones vector of X', Y' base in signal light immediately after the BPSK modulation unit 812 is indicated at $E_2'$, and when Jones vector of X', Y' base in signal light immediately after the BPSK modulation unit 813 is indicated at $E_3'$, $E_2'$ and $E_3'$ are as follows according to Equation 11.

[Formula 18]

$$E_2' = \begin{pmatrix} b_2 & 0 \\ 0 & 0 \end{pmatrix} T_1' \begin{pmatrix} 1 \\ 0 \end{pmatrix} = \frac{1}{2}\begin{pmatrix} b_2(b_1 - j) \\ 0 \end{pmatrix} \quad \text{(Equation 12)}$$

$$E_3' = \begin{pmatrix} b_3 & 0 \\ 0 & 0 \end{pmatrix} T_2' \begin{pmatrix} 1 \\ 0 \end{pmatrix} = \frac{1}{2}\begin{pmatrix} b_3(1 - jb_1) \\ 0 \end{pmatrix}$$

Herein, $b_2$ and $b_3$ are modulation parameters of the BPSK modulation units 812 and 813, and takes either one of +1 or −1 in a symbol point (center timing of a symbol on time axis). $a_3$ is a transmission rate to Y' polarization of the BPSK modulation unit 813, but since input light to the modulation unit is X' polarization, a value of $a_3$ does not affect the output light.

When Jones vector of X', Y' base of output light from the main output port 802 is indicated at $E_{out}'$ and when Jones vector of X, Y base of the output light from the main output port 802 is indicated at $E_{out}$, the following relation is established.

[Formula 19]

$$E'_{out} = S'_1 E'_2 + S'_2 R' e^{j\phi} E'_3 \quad \text{(Equation 13)}$$
$$\phi = 0$$
$$R' = \begin{pmatrix} 0 & -1 \\ 1 & 0 \end{pmatrix}$$
$$S'_1 = \begin{pmatrix} 1 & 0 \\ 0 & 0 \end{pmatrix}$$
$$S'_2 = \begin{pmatrix} 0 & 0 \\ 0 & 1 \end{pmatrix}$$
$$\therefore E'_{out} = \frac{1}{2} \begin{pmatrix} b_2(b_1 - j) \\ b_3(1 - jb_1) \end{pmatrix}$$
$$E_{out} = \frac{1}{\sqrt{2}} \begin{pmatrix} 1 & 1 \\ -1 & 1 \end{pmatrix} E'_{out}$$
$$= \frac{1}{2\sqrt{2}} \begin{pmatrix} b_1 b_2 + b_3 + j(-b_2 - b_1 b_3) \\ -b_1 b_2 + b_3 + j(b_2 - b_1 b_3) \end{pmatrix}$$

Here, φ is a phase shift amount of the phase adjusting unit 822, and φ=0 in this example. R' is a transmission characteristic of the 90-degree polarization rotating unit 851, and each of $S_1'$ and $S_2'$ is Jones matrix of X', Y' base expressing a transmission characteristic of the polarization coupling unit 852 to optical signals from the side of an optical path 863 from the side of an optical path 864. In this example, the polarization coupling unit 852 is a polarization beam combiner of polarization axes X' and Y'.

The following relation is established according to Equation 2 and Equation 13 in this example.

[Formula 20]

$$E_{XI} = \frac{1}{2\sqrt{2}} (b_1 b_2 + b_3) \quad \text{(Equation 14)}$$
$$E_{XQ} = \frac{1}{2\sqrt{2}} (-b_2 - b_1 b_3)$$
$$E_{YI} = \frac{1}{2\sqrt{2}} (-b_1 b_2 + b_3)$$
$$E_{YQ} = \frac{1}{2\sqrt{2}} (b_2 - b_1 b_3)$$
$$\phi'_X = \arg\{b_2(b_1 + j)\}$$
$$\phi'_Y = \arg\{b_3(1 - jb_1)\}$$

Figure 9A:
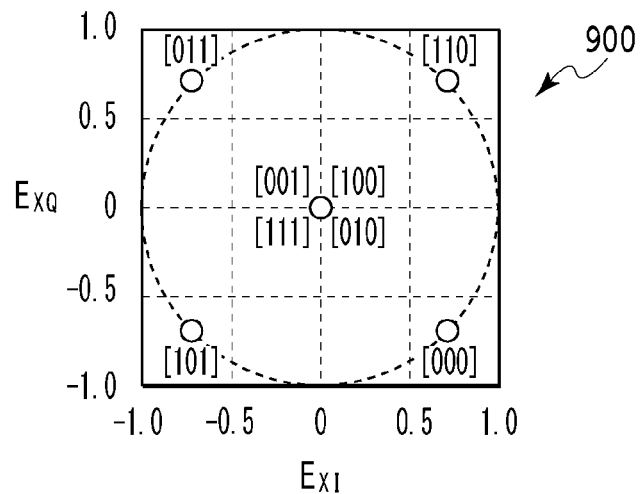
FIG. 9A is a final output signal diagram of the PS-QPSK modulator according to the second embodiment in the present invention.
Figure 9B:
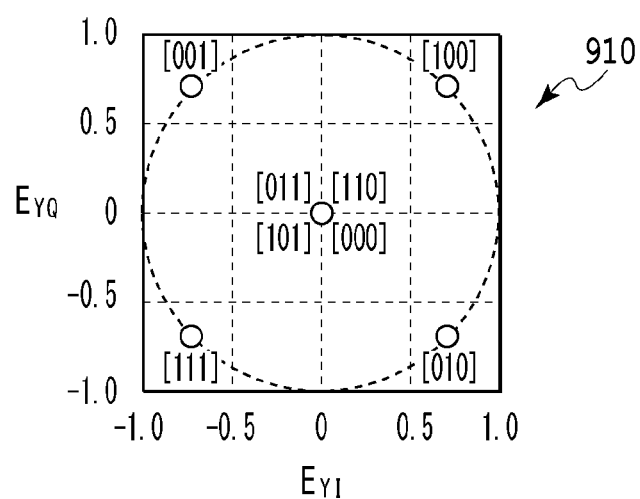
FIG. 9B is a final output signal diagram of the PS-QPSK modulator according to the second embodiment in the present invention.
Figure 9C:
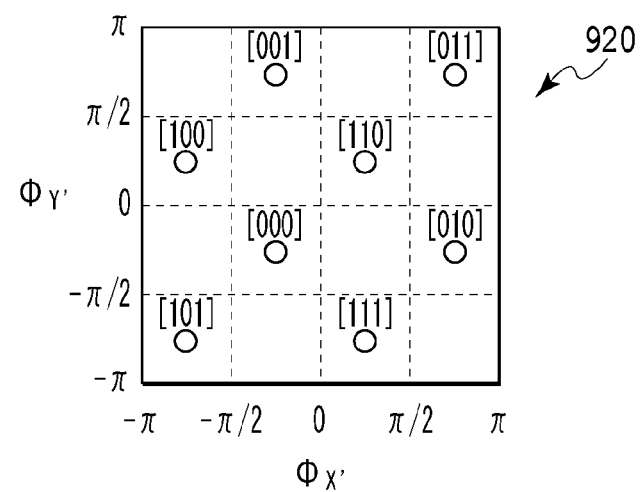
FIG. 9C is a final output signal diagram of the PS-QPSK modulator according to the second embodiment in the present invention.
Figure 10:
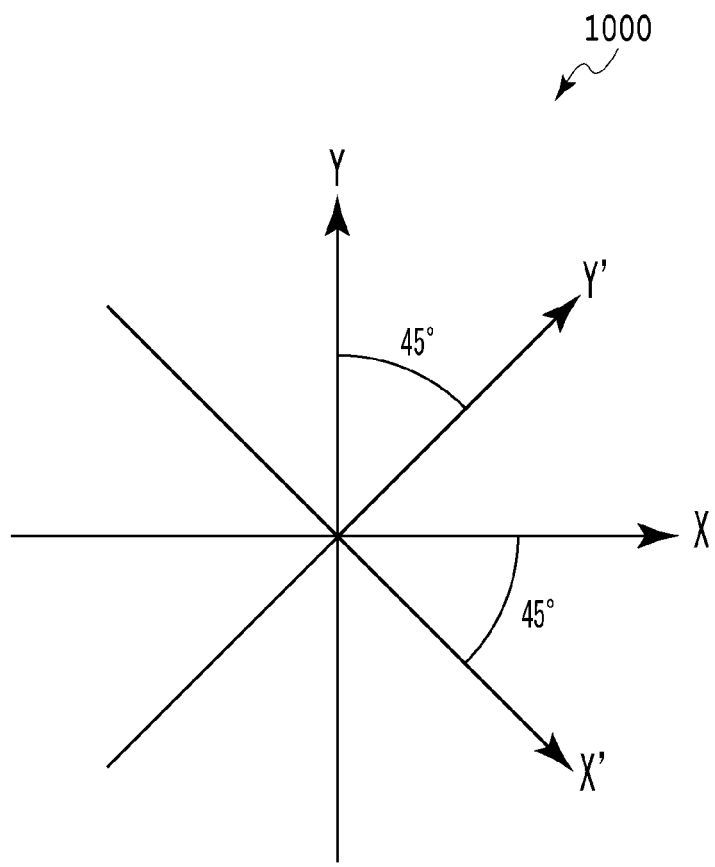
FIG. 10 is a diagram illustrating a definition of polarization axes in the present specification.

FIG. 9A, FIG. 9B, and FIG. 9C show IQ diagrams and an XY diagram indicating a relation between $d_1$ to $d_3$ in the modulator configuration shown in FIG. 8 and $E_{out}$ shown in Equation 13. FIG. 9A is an IQ diagram in regard to X polarization of $E_{1out}$, FIG. 9B is an IQ diagram in regard to Y polarization of $E_{out}$, and FIG. 9C is an XY diagram of $E_{out}$. According to the above corresponding relation of $d_n$ and $b_n$, and Equation 14, the mapping shown in each of FIG. 9A, FIG. 9B and FIG. 9C can be obtained.

As shown in FIG. 9C, it is found out that also in this example, the XY diagram composed of eight signal points can be obtained and the PS-QPSK signal can be obtained as similar to the output signal in the conventional art shown in FIG. 2C and in FIG. 4B.

The distance from the original point to each signal point in the IQ diagrams in FIG. 9A and FIG. 9B is [Formula 21: √2] times larger than that in the IQ diagrams in FIG. 2A and FIG. 2B. This means that the output optical intensity that is twice that of the conventional art can be obtained in the present embodiment relative to the same input optical intensity. As described before, $|E_{out}|^2 = 1/2$ in the conventional arts 1 and 2 (Equations 1 and 4), and on the other hand, $|E_{out}|^2 = 1$ in the present embodiment (Equation 13). That is, the intrinsic loss 3 dB is generated in the conventional art, and the intrinsic loss is 0 dB in the present embodiment.

As explained above, the PS-QPSK signal can be generated without generation of the intrinsic loss by a simple configuration composed of the binary data drive systems of three lines and the three BPSK modulation units.

It should be noted that the qualitative and intuitive explanation of the reason that the intrinsic loss is 0 dB in the present embodiment is approximately the same as in the case of the above first embodiment. In the present embodiment, each of output to the side of the optical path 863 and output to the side of the optical path 864 in the intermediate optical coupling unit 832 is an irregular binary phase modulation signal having a phase changing amount π/2, but both the outputs have a relation of a normal phase and a reverse phase (the phase shift direction is reversed) with each other. It is possible to reduce the intrinsic loss to be 0 dB with a new concept that the normal phase signal and the reverse phase signal are respectively further modulated by independent data and both thereof are combined by orthogonal polarization to obtain a final output signal.

Also as to the arrangement of the polarization rotating unit 851 in the final optical coupling unit 581, any arrangement may be, as similar to the above first embodiment, made if only polarization states in the side of the optical path 863 and in the side of the optical path 864 bisect each other at right angles. It is similar to the case in the first embodiment that the phase adjusting unit 822 is often unnecessary. It is also similar to the case of the first embodiment that the optical phase adjusting unit 821 becomes unnecessary if manufacturing techniques and materials by which a relative phase between optical paths can be controlled with high accuracy are available. Further, points where in the optical intensity adjusting unit 841, the loss value may usually be a fixed value, where in a case where manufacturing variations of the excessive loss in the BPSK modulation unit 811 are small, an adjusting unit (small-diameter bending or the like) in which the loss value is fixed on a design stage may be used, where in a case where manufacturing variations of the excessive loss in the BPSK modulation unit 811 are large, it is desirable to make it unnecessary for a user to perform the loss value adjustment for each time after shipment by using a unit in which the loss value is stabilized to a desired value by trimming, and where manufacturing variations of the excessive loss in the BPSK modulation unit 811 are sufficiently small, the optical intensity adjusting unit 841 becomes unnecessary are also similar to the case of the first embodiment.

In addition, even if the BPSK modulation unit 811 is arranged in the optical path 862 and the optical intensity adjusting unit 841 is arranged in the optical path 861, it can easily be confirmed that the data mapping is only changed and the similar effect can be obtained.

According to the present invention, there can be provided the PS-QPSK optical modulator in which the intrinsic optical loss is not generated and the configuration is simple.

REFERENCE SIGNS LIST 501, 801 Main input port
502, 802 Main output port
511, 512, 513, 811, 812, 813 BPSK modulation unit
521, 522, 821, 822 Phase adjusting unit

531, 831 Input optical splitting unit
532, 832 Intermediate optical coupling unit
541, 841 Optical intensity adjusting unit
551, 851 Polarization rotating unit
552, 852 Polarization coupling unit
561, 562, 563, 564, 861, 862, 863, 864 Optical path
581, 881 Final optical coupling unit

The invention claimed is:

1. An optical modulator comprising:
    an input optical splitting unit for bifurcating input light from a main input port;
    a final optical coupling unit for coupling optical signals of two lines in polarization states orthogonal to each other to output to a main output port;
    an intermediate optical coupling unit provided in an intermediate position between the input optical splitting unit and the final optical coupling unit, the intermediate optical coupling unit including at least two input ports and at least two output ports;
    first and second optical paths for connecting the input optical splitting unit and the intermediate optical coupling unit, optical path lengths of the first and second optical paths are approximately equal to each other;
    third and fourth optical paths for connecting the intermediate optical coupling unit and the final optical coupling unit, optical path lengths of third and fourth optical paths are approximately equal to each other; and
    three binary phase modulation unit arranged in three optical paths out of the first, second, third and fourth optical paths, respectively.

2. An optical modulator according to claim 1, wherein each of the binary phase modulation unit is a Mach-Zehnder modulation circuit.

3. An optical modulator according to claim 2, comprising an optical intensity adjusting unit provided in a single optical path, in which the binary phase modulation unit is not arranged, among the first, second, third and fourth optical paths.

4. An optical modulator according to claim 2, comprising a phase adjusting unit for adjusting a relative optical phase between the first and second optical paths.

5. An optical modulator according to claim 4, comprising an optical intensity adjusting unit provided in a single optical path, in which the binary phase modulation unit is not arranged, among the first, second, third and fourth optical paths.

6. An optical modulator according to claim 1, comprising a phase adjusting unit for adjusting a relative optical phase between the first and second optical paths.

7. An optical modulator according to claim 6, comprising an optical intensity adjusting unit provided in a single optical path, in which the binary phase modulation unit is not arranged, among the first, second, third and fourth optical paths.

8. An optical modulator according to claim 1, comprising an optical intensity adjusting unit provided in a single optical path, in which the binary phase modulation unit is not arranged, among the first, second, third and fourth optical paths.

* * * * *